United States Patent [19]
Arai et al.

US005616450A

[11] Patent Number: 5,616,450
[45] Date of Patent: Apr. 1, 1997

[54] METHOD FOR FABRICATING AN OPTICAL INFORMATION MEDIUM

[75] Inventors: Yuji Arai; Takanobu Matumoto; Yuaki Shin; Takashi Ishiguro, all of Tokyo, Japan

[73] Assignee: Taiyo Yuden Co., Ltd., Tokyo, Japan

[21] Appl. No.: 437,394

[22] Filed: May 9, 1995

Related U.S. Application Data

[62] Division of Ser. No. 223,465, Apr. 5, 1994, Pat. No. 5,470,691.

[30] Foreign Application Priority Data

| Apr. 10, 1993 | [JP] | Japan | 5-107617 |
| Apr. 24, 1993 | [JP] | Japan | 5-120996 |
| Apr. 24, 1993 | [JP] | Japan | 5-120999 |

[51] Int. Cl.⁶ ............................................. G11B 7/26
[52] U.S. Cl. ................. 430/321; 430/270.11; 430/945
[58] Field of Search ................ 430/321, 273, 430/945, 270.11; 101/129; 347/105

[56] References Cited

U.S. PATENT DOCUMENTS

| 5,312,663 | 5/1994 | Kosinski et al. | 428/64 |
| 5,317,337 | 5/1994 | Ewaldt | 347/2 |
| 5,422,226 | 6/1995 | Aihara et al. | 430/273 |

FOREIGN PATENT DOCUMENTS

| 0574860 | 12/1993 | European Pat. Off. |
| 1-043826 | 2/1989 | Japan |

*Primary Examiner*—John A. McPherson
*Attorney, Agent, or Firm*—Flynn, Thiel, Boutell & Tanis, P.C.

[57] ABSTRACT

An optical information medium providing a protective layer above an optically transparent substrate to protect a recording part, and can record information which is optically readable by means of laser beam. An aqueous printing ink-fixable, hydrophilic resin film is formed on the protective layer. Given letters and patterns can be printed easily and satisfactorily. Such letters and patterns are printable by means of, for example, an ink jet printer.

2 Claims, 3 Drawing Sheets

5,616,450

METHOD FOR FABRICATING AN OPTICAL INFORMATION MEDIUM

This is a division of Ser. No. 08/223,465, filed Apr. 5, 1994 now U.S. Pat. No. 5,470,691.

BACKGROUND OF THE INVENTION

1. Field of the Invention

This invention relates to an optical information medium printable on a surface thereof opposite to the incidence of laser beam by use of a printing ink, and a method for fabricating the same.

2. Description of the Prior Art

In the fields such as of audio and information processings, an optical information medium called as a compact disk (hereinafter referred to simply as CD) has now been in wide use. The CD has a structure comprising a substrate in the form of a doughnut-shaped disk made, for example, of polycarbonates, and a reflective layer of gold or aluminium vacuum deposited on the substrate. A protective layer such as of a UV-cured resin is formed on the reflective layer. Information data are encoded by forming projected and recessed pits on or in the surface of the substrate according to a spiral arrangement. Simultaneously with the formation of the substrate, these pits have been formed using molds such as stampers. The reflective layer is then formed on the pits-bearing substrate. When fabricated, the CD has already had the data encoded therein and can be thus used as a read-only optical information medium.

Usual practice is that the CD has an index indicating a recorded content and a variety of designs printed on the surface of the protective layer with use of a UV-curable or oily ink. These prints have been usually made by a printing means or procedure using transfer from a printing plate, such as screening printing, tampon printing or offset printing. These printing procedures are ones which are particularly suitable for so-called mass printing wherein the same pattern is printed in great number at one time.

On the other hand, musical performance by amateur players has recently become enthusiastic. As a wide variety of amateur players are being taken part in such performance, it has become full of activities that amateur players individually make a relatively small number of CDs of their own work. These CD articles are created for the purposes, for example, of promotion, audition, test and setting up on their own expenses. Especially, because write-once optical information mediums which are so-called CD-WO and in which information can be written once by use of a laser beam and can be reproduced with use of a CD player have now been developed, such a self-made CD can be made more readily. Alternatively, in the field of computers, so-called CD-ROM has become popular. As the write-once optical information medium has spread, users have now started to set up CD-ROM using CD-WO.

The protective layer of the optical information medium such as the thus self-made CD has no statement thereon, or has general letters or patterns alone printed thereon by means of a UV-curable ink or oily ink. It is thus necessary to indicate the index of a record content and, if necessary, other designs, on the surface of the protective layer or the printed surface of a label prior to or after recording of private information in the optical information medium.

However, the aforementioned printing procedure or means is used to print during the course of the fabrication process of the medium after formation of the protective layer. Since both protective layer surface and print surface are hydrophobic in nature, an excessive equipment becomes necessary in order to print the protective layer on the surface thereof after recording of the private information. This eventually makes it difficult to arbitrarily print personal and optionally desired information. Accordingly, it is usual to draw on the surface of the protective layer by use of an oily felt tipped pen or to paste a label on the surface. However, this requires to hand-write one by one, thus being troublesome. In addition, the drawn patterns or their quality will not be made uniform with a poor show, thus presenting such problems as that the optical information medium obtained is of less elegant format as a whole and might be damaged due to hand-writing. Especially, where a label is pasted, the surface is raised by the thickness of the pasted label, leading to the problem that the optical information medium will undesirably undergo eccentric revolutions or surface fluctuation when reproduced and followed up.

SUMMARY OF THE INVENTION

An object of the invention is to provide an optical information medium wherein given letters or patterns can be readily, satisfactorily formed on the surface of a protective layer of the medium and what is recorded therein is secured by a protective function.

Another object of the invention is to print a relatively smaller number of optical information medium with given letters and patterns on the surface thereof readily and substantially at a certain quality.

According to the invention, a hydrophilic resin film is formed on the back surface, opposite to the incidence direction of laser beam, of an optically transparent substrate of the optical information medium. The hydrophilic resin film is sufficiently feasible to fix an aqueous printing ink so as to print or draw on the surface of the film.

The optical information medium of the invention comprises a plate-shaped, optically transparent substrate and a protective resin layer which is formed through the other layer on the substrate and is capable of reproducing and/or recording optically readable informations. A typical example of such an optical information medium includes the above mentioned CD write-once.

It is possible to draw arbitrary letters or patterns on the back surface, opposite to the incidence direction of laser beam, of the present optical information medium by use of either means for an aqueous or oily ink drawing, although any other means such as for UV-curable ink is also applicable.

Printing of these letters or patterns on the surface of the hydrophilic resin film is effected by jetting an aqueous ink toward the surface to deposit and fix the ink thereon. The printing thus effected results in a desired indication of letters or patterns on the surface of the optical information medium without damaging the protective layer and the substrate. The aqueous ink is fixed firmly on the resin film, which contribute to improve an aesthetic property of the print. According to the invention, dusts are not easily adhered on the medium because of the hydrophilic nature of the surface, which is also favorable to an appearance and handling thereof. In addition, the hydrophilic resin film has enough thickness to fix the ink on the surface so as to prevent an excessive spread of ink and to result in a desirable appearance. In contrast to a uneven surface of a labeled one, the present ink printing process on the film makes the surface flat, thereby occurrence of eccentric revolutions and surface fluctuation on reproduction and follow-up are avoidable. When letters or patterns are printed on the surface of hydrophilic resin film, printed patterns and quality thereof are highly designed if they have been previously created by means of personal computers, etc.

The hydrophilic resin film used to increase the printability such as wetting and hydrophilic properties includes, for example, at least one of polymers or compounds selected from the group consisting of polyethylene oxide, polyvinyl alcohol, polyvinylmethyl ether, polyvinyl formal, carboxyvinyl polymer, hydroxyethyl cellulose, hydroxypropyl cellulose, methyl cellulose, sodium carboxymethyl cellulose, polyvinyl pyrrolidone and morpholine.

The hydrophilic resin film used herein is swollen by moisture absorbed thereon and alternatively, is dried again to shrink to an extent of its original volume in circumstances such as a waterproof test condition. Because of a stepwise edge structure of the intermediate layer, both peripheries thereof tend to be damaged due to their poor structural strength when the film is swollen or dried. Accordingly, it is preferred that the hydrophilic resin film is arranged on the protective layer inside of either inner or outer periphery of the intermediate layer. In such an arrangement of the film, even if stress is occurred in the protective layer when the hydrophilic resin film is swollen and shrunk repeatedly by a printing ink deposited thereon, the stress is scarcely transmitted to the edge area of the intermediate layer. This lowers an occurrence of cracks, debonding or peeling around the layer edge and favorably prevent deterioration of the recording and reproducing properties during a reliability measurement such as acceleration test.

A boundary integrity between the hydrophilic resin film and the protective layer should be more secure than that of other layers consisted of the optically transparent substrate. Such a boundary integrity desirably protects the intermediary between the protective layer and the substrate without the film peeling from the layer which might be occurred by repeated swelling and shrinkage during the ink deposition and drying process, and is able to maintain the recording and reproducing properties stably. Further, a decreased occurrence of deflection of the optical information medium as a whole or the above described peeling of the film considerably contributes to improve weathering resistance and reliability of the medium.

A protective layer of CD, a typical example of optical information media, comprises an UV-curable resin in many cases. A hydrophilic resin film to be applied to the UV-curable protective layer is preferably UV-curable, too. Especially, when the hydrophilic resin film suitable to deposit an aqueous printing ink is applied and UV-cured on the protective layer which has already been UV-cured, the boundary integrity between them is increased more than that of other layers in the optically transparent substrate. Such a resin film is easily formed by a similar process known as a thick-film method in the case of screen printing, which allows to decrease in deflection or eccentric revolution of the medium and maintain the recording and reproducing properties effectively.

It is preferable to form the hydrophilic resin film under such a condition that radical molecules of the UV-curable resin substantially exist on the surface of the protective layer, i.e., the film should preferably be applied on the layer before all of these molecules are completely reacted or disappeared. This results in a further improvement of the boundary integrity.

The protective layer may be UV-cured after a UV-curable resin liquid is coated on the substrate in order to shorten a layer hardening time thereof. The hydrophilic resin film is UV-cured after a UV-curable hydrophilic resin in liquid state is coated on the protective layer in order to carry out the UV-cure similarly as the former case in a simplified line process in a short time. According to the process described above, disadvantages such as deflection or peeling of the optically transparent medium caused by the hydrophilic resin film to be applied thereon are decreased, thereby deterioration of the recording and reproducing properties being prevented effectively. A printing ink comprising such a hydrophilic UV-curable resin is applied on the protective layer by means of, for example, screen printing, to print a desired region of the surface.

Shrinkage of the hydrophilic resin film caused by UV-cure is preferably smaller than that of the UV-curable resin layer. When a cure-shrinkable ink is used to form both of the protective layer and the hydrophilic resin film, the cure-shrinkage of the former is preferably smaller than that of the latter. Any deflection caused by the hydrophilic film formation may easily be prevented because of such a difference in shrinkage.

Preferably, thickness of the hydrophilic resin film is thicker than that of the protective layer, while hardness of the former is lower than that of the latter in order to prevent damages on the surface of the medium due to pressure of drawing materials.

The surface of the hydrophilic resin film should preferably be finely roughened to decrease a contact angle of the ink to the surface so as to improve an ink depositing ability and printability. In addition, fingerprints are seldom adhered on the surface of the medium if it is touched by hands. The surface of the hydrophilic resin film may be finely roughened by dispersing pigments in the resin or by any conventional roughening treatment.

PREFERRED EMBODIMENTS OF THE INVENTION

Reference is now made to embodiments of the invention.

Figure 1:
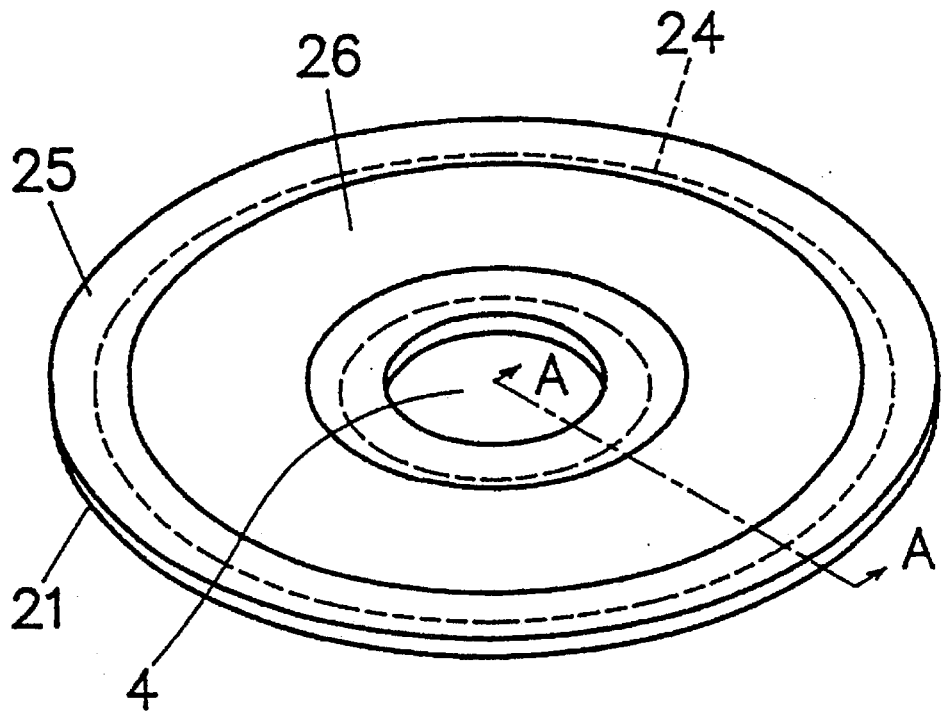
FIG. 1 is a perspective view of an outer appearance of an optical information medium.

FIG. 1 shows an optical information medium as viewed from a side opposite to a side through which laser beam is incident. Accordingly, an optically transparent substrate 21 is at a lower side as viewed in the figure. As shown in the figure, a UV-cured resin layer 25 has a hydrophilic resin film 26 on the surface thereof. A clamp hole 4 is provided at the center of the medium. When the medium is set in position of a CD player, it is clamped by means of a clamper of a spindle.

Figure 2:
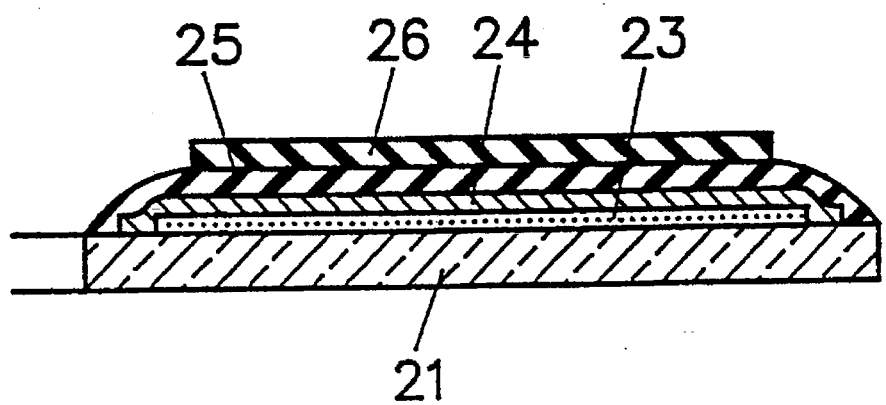
FIG. 2 is a sectional view taken as indicated by the line A—A on FIG. 1.
Figure 3:
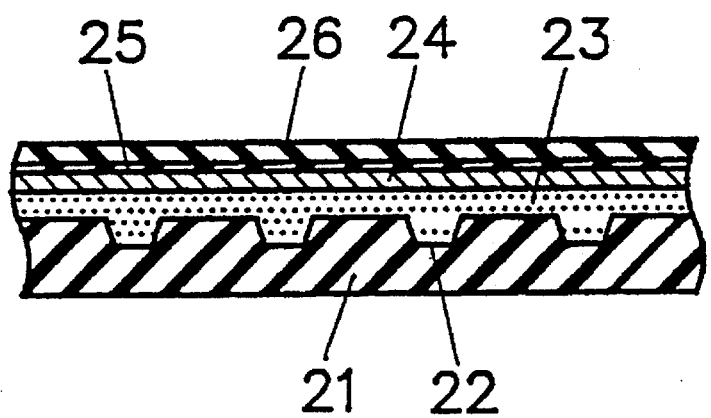
FIG. 3 is a schematic longitudinal sectional view of an essential part of an optical information medium according to one embodiment of the invention.
Figure 4:
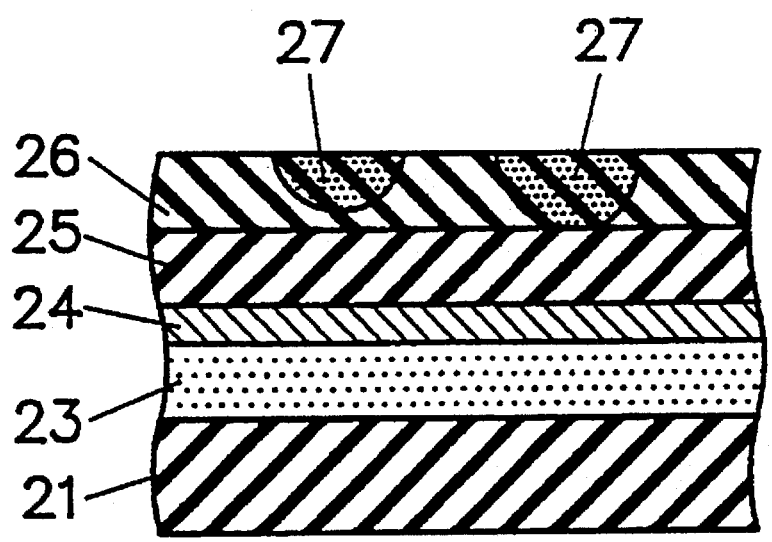
FIG. 4 is schematic longitudinal sectional view of an essential part of an optical information medium with fixed ink according to one embodiment of the invention.

FIG. 2 shows a schematic sectional view taken as indicated by the line A—A on FIG. 1, in which thickness of layers is intentionally enlarged for a drawing reason. FIG. 3 shows the schematic section of a so-called write-once optical information medium provided as an example of the medium set out above. The transparent substrate 21 made, for example, of a polycarbonate resin has a spiral tracking guide groove 22 on one side thereof, on which a dye recording layer 23 is coated. A reflective layer 24 made of a metallic film such as gold, silver, aluminium or the like is formed on the dye recording layer, on which a protective layer 25 is formed. Moreover, as will be mentioned in the following, a hydrophilic resin layer 26 is formed on the protective layer 25. FIG. 4 shows further enlarged schematic sectional view of an indication part of an optically transparent medium in which an aqueous or other type of ink 27 is fixed on a hydrophilic resin film 26 formed on a protective layer 25 as will be described in the following.

Figure 5:
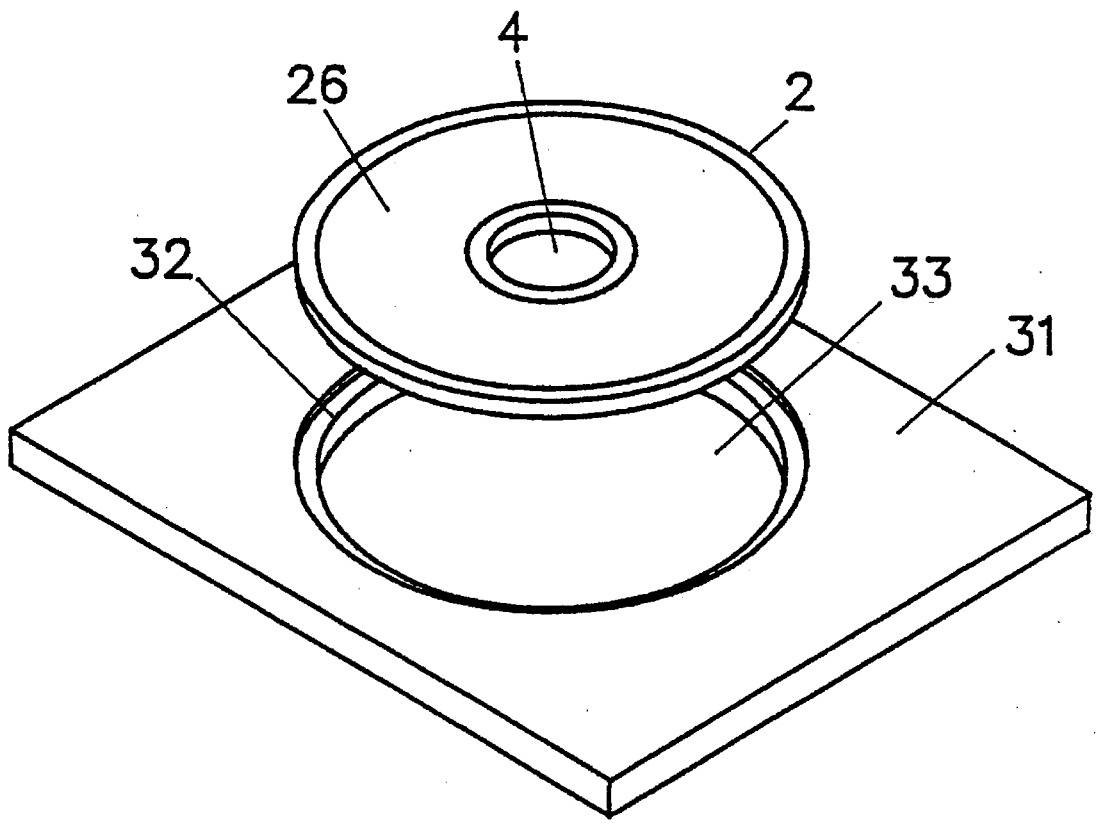
FIG. 5 is perspective exploded view of a holder used to print on the surface of an optically transparent medium by use of an ink jet printer and an optical information medium.
Figure 6:
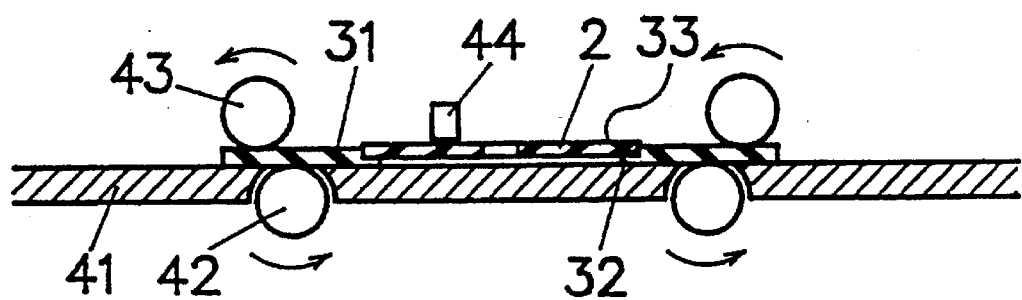
FIG. 6 is a schematic sectional view of an essential part of an ink jet printer used in an embodiment of the present invention.

FIG. 6 is a sectional view showing an essential part of a printing device for carrying out ink jet recording on the hydrophilic resin film 26 of the write- once optical information mediums set out hereinabove. FIG. 5 shows a holder 31 for holding the optical information medium 2 when ink jet recording is effected using the printing device.

The holder 31 has a rectangular form and is provided at the center thereof with a round hole 33 which has a diameter slightly larger than an outer diameter of the medium 2. The hole 33 has a stepped portion 32 along the entire inner periphery thereof in order to hold the outer edge of the medium 2. The stepped portion 32 has a depth slightly smaller than that of the medium 2. As shown in FIG. 5, the optical information medium 2 is inserted into the hole 33 of the holder 31 such that the hydrophilic resin film 26 is turned upside and the outer peripheral portion at the incident side of reproduction light of the medium 2 is supported with the stepped portion 32. As a consequence, the medium 2 is supported with the holder 31 in such a way that the surface of the hydrophilic resin film 26 is slightly higher than that of the holder 31.

The medium 2 held with the holder 31 is mounted on a feed table 41 of the printing device shown in FIG. 6. Subsequently, rollers 42, 43 are moved to a position where the holder 31 is contacted therewith at the edge portion thereof. When printing signals such as from a computer are inputted to the printing device, the holder 31 is started to move by means of the roller 42, 43. Where the optical information medium 2 is passed along the table 41 above which a printing head 44 is disposed, the printing head 44 serves to jet the particles of a printing ink on the surface of the hydrophilic resin film 26 of the medium 2 thereby printing desired letters or patterns on the surface of the film 26.

As having been set forth hereinabove, the printing device shown in FIG. 6 is an ink jet printer. As is well known in the art, the printing head 44 has a plurality of fine printing nozzles being arranged. The printing nozzles have, for example, an electrotheremo converter worked according to electric signals, by which an ink in the nozzles is bubbled thereby jetting the ink from the tip of the individual nozzles. By this, the medium 2 passed along the feed table 41 is deposited with the jetted ink in position of the surface of the hydrophilic resin film 26.

The plate-shaped, optically transparent substrate 21 used in the medium 2 is generally made of resins whose refractive index relative to a laser beam ranges from 1.4 to 1.6 and which has high transparency with good impact resistance. Specific examples of the resin include polycarbonates, polyolefins, acrylic resins and the like although not limited to these ones.

The substrate 21 is molded, for example, by injection molding using these resin materials. As shown in FIG. 3, the substrate 21 may be provided with a spiral guide groove 22 in the surface thereof although a tracking guide means in other forms may be used. Such a tracking guide means is usually formed by any known procedures using stampers.

The optical information medium is provided at least with a portion where information which is optically readable by means of a laser beam can be recorded or a recorded portion. The portion is intended to mean a layer from which information can be optically reproduced or recorded by irradiation with a laser beam, or a substrate surface or other surface which takes part in recording and reproduction. For instance, with the optical information medium of the write-once type shown in FIGS. 1 to 3, the dye recording layer 23 and the reflective layer 24 formed on the substrate 21 in this order allow recording and reproduction of information. On the other hand, with a read-only optical information medium such as CD in which an optical reflective layer and a protective layer are formed on the substrate, pit arrays formed on the transparent substrate 21 and the reflective layer covering the arrays take part in the reproduction of information.

The recording or reproduction system is optically arranged and is generally one which makes use of laser beams or an magneto-optical recording and reproducing system. Information is recorded or reproduced from one side of an optical information medium. In particular, a laser beam is passed from the surface side of the optically transparent substrate 21.

When a laser beam is used for recording or reproducing ray, the wavelength is generally in the range of 770 to 830 m. Laser beam having a wavelength outside the above range may also be used.

Aside from the dye recording layer 23 and the reflective layer 24 shown in FIG. 3, there may be formed other layers. For instance, a layer for modifying binding properties or a layer for improving reliability other than recording of information may also be formed. In addition, an antioxydizing layer may exist between the reflective layer 24 and the protective layer 25 to prevent oxidation of the layer 24. In FIG. 3, the dye recording layer is directly formed on the optically transparent substrate 21, but other layer may be intervened therebetween.

The protective layer 25 is one which protects an information record portion against physical or mechanical damages as will be suffered from a side opposite to the transparent substrate 21, and is thus provided at a side opposite to the substrate 21. The protective layer 25 should preferably be made of an impact-resistant resin. For example, the protective layer 25 should preferably have a pencil hardness of 2H to 7H/Glass and a heat distortion temperature more than 80° C. and more preferably, more than 100° C. The thickness of the protective layer 25 is preferably in the range of from 5 to 10 μm and the layer may be made of a plurality of sub-layers which are, respectively, made of different types of materials.

The protective layer 25 is formed by applying a monomer and/or an oligomer of an organic compound capable of being polymerized into a polymer and subjecting the applied one to crosslinking reaction. Where an organic polymer is obtained by crosslinking reaction, it is convenient in handling to use a procedure which comprises adding small amounts of a reaction initiator and a catalyst for the reaction to a mixture of a monomer and an oligomer of organic compounds which have one or more reactive acryloyl groups(—CH=CH) in the molecule, or if necessary, diluting with a solvent such as methyl ethyl ketone, alcohol and the like to form a liquid mixture, applying the liquid mixture, and subjecting the applied mixture to irradiation of UV light or an electron beam for crosslinkage. Especially, it is preferred to use UV-curable resins because they can prevent an adverse influence on the substrate and the information layers upon formation of the protective layer 25 and can be formed within a short time.

The UV-curable resins may be any known UV-curable resins which are ordinarily used in optical information mediums. Examples include N-vinyl pyrrolidone, tripropylene glycol diacrylate, trimethylol propane triacrylate, hexanediol diacrylate and the like.

The manner of crosslinkage is not limited to those attained by UV-irradiation. Crosslinkage by application of heat such as for epoxy resins and urethane resins may be used. Alternatively, it is possible to make use of a polymerization reaction which proceeds with the aid of moisture in, such as for dialkoxysilane coupling agents.

The thus obtained crosslinked product may have the backbone or side chains which contain saturated or unsaturated linear hydrocarbons, or may contain cyclic units such as of melamine, bisphenol or the like. Alternatively, the crosslinked product may be polyethers which have in the backbone or side chain one or more ether bonds, polyesters which have ester bonds, polyurethanes which have urethane bonds, ionomers containing ionic bonds, polyamides containing amido bonds, polyimides containing imido bonds, polysulfones containing sulfone bonds, polysulfides containing sulfido bonds, and other polymers containing other bonds. Of course, copolymers containing two of the bonds set out above, or more block polymers may be used.

In order to improve the moisture proofing properties of the crosslinked products, fluorocarbons may be contained in the side chains. In order to prevent degradation caused by hydrogen chloride, epoxy resins may be contained.

For improving the adhesion between the protective layer 25 and the reflective layer 24 or the hydrophilic resin film 26, it is preferred that the crosslinked products may contain in the side chains a hydroxyl group, a carboxyl group, an acrylic group, an amino group, a vinyl acetate group and the like. Alternatively, basic acid residues may be contained in the backbone or side chain.

For the formation of the protective layer 25, solvents or diluents may be added, aside from a reactant and a reaction initiator, to the resin in the coating composition. In order to stabilize the coating film, additives such as leveling agents, plasticizers, antioxidants, antistatic agents and the like may be contained. If necessary, the layer may be colored by use of pigments or dyes.

The curing of the resin may be changed depending on the crosslinking density of a crosslinked structure or the reactive acryloyl concentration, and may also depend on the freedom of the revolutions of molecules of an oligomer which will constitute the main chain. When the rate of shrinkage at the time of curing the protective layer 25 is reduced, the protective layer is left as not strained after the curing. Thus, the layer is unlikely to break when subjected to a heat cycle test. Taking mechanical strength into consideration, the rate of shrinkage is preferably in ranges not larger than 12%, more preferably not larger than 10%.

The protective layer 25 may be formed by bonding a resin material to the reflective layer 24 without resorting to the coating technique. The materials may not be limited to organic compounds, but inorganic compounds may be used to form the layer by sputtering or vacuum deposition.

In the practice of the invention, the optical information medium has the hydrophilic resin film 26 so that the surface opposite side of the optical transparent substrate 21 is fixed with a printing ink in desired patterns. The hydrophilic resin film 26 is one which has hydrophilicity sufficient to fix an aqueous ink when the ink is dropped thereon and is not blotted on touch with finger after 30 minutes. More particularly, the surface film allows the ink which is not deposited on the surface merely by drying of the ink but is fixable to an extent that the ink is not readily removed. The ink printed on the hydrophilic resin film 26 is fixed thereon without any reduction in the area of deposition. The surface of indication thus fixed is flat. The term "flat" used herein is intended to mean that there is substantially no difference in the surface roughness between indicated and not-indicated parts.

The hydrophilic resin film 26 may be formed thoroughly on the surface of protective layer 25, or as shown in FIGS. 1 and 2, may also be formed to leave space along the inner and outer edge peripheries of the protective layer 25. In addition, the hydrophilic resin film 26 should preferably be formed on a superficially inside area along either inner or outer edge periphery of an intermediate layer, e.g., the reflective layer 24, between the protective layer 25 and the optically transparent substrate 21. More preferably, the resin film 26 is formed on a superficially inside area along inner and outer edge peripheries as shown in FIG. 2. However, when the outer edge periphery of the protective layer 25, for example, is extended to that of the substrate 21 and directly adhered to each other, the hydrophilic resin film 26 may be formed over the outer periphery of the reflective layer 24, etc.

Examples of the hydrophilic resins include polyethylene oxide, polyvinyl alcohol, polyvinylmethyl ether, polyvinyl formal, carboxyvinyl polymers, hydroxylethyl cellulose, hydroxypropyl cellulose, methyl cellulose, sodium carboxymethyl cellulose, polyvinyl pyrrolidone, acryloyl morpholine, ketone formaldehyde, styrene/maleic anhydride copolymer, shellac, dextrin, poly(acrylate pyrrolidonyl ester), polyacrylic acid and its metal salts, polyamine, polyacrylamide, polyethylene glycol, polydiethylaminomethacrylate, polyhydroxystyrene, polyvinyl alkyl ether, polyvinylhydroxybenzoate, polyphthalate, cellulose acetate hydroxydiene phthalate, graft polymers which have methyl methacrylate as a principal chain and N-methylolacrylamide as a side chain, such as LH-40 available from Soken Kagaku Co., Ltd. and similar water soluble alkyd, water soluble polyester, water soluble polyepoxy, polyamide, saponified polyvinyl acetate, carboxymethyl cellulose, gum arabic, guar gum, sodium aragonite and the like. At least one hydrophilic resin is selected from the group above mentioned and formulated with a photo polymerizable monomer as will be described in the following, a photo polymerization initiator and other additives, if necessary, which is then used for coating.

While taking into account the weather resistance, water proofing properties, reliability and productivity of the optical information medium, the resins are mixed as controlled in formulation balance. The amount of the hydrophilic resin may be in the range from 5 wt % to a solubility limit (e.g., 50 wt %), preferably from 5 to 20 wt % of total weight of liquid. If the amount is in excess, water proofing properties are worsened with the tendency to degrade working properties during printing. On the contrary, when the amount is smaller, the wettability of ink becomes poor, with the possibility of giving rise to thin spots after printing.

It is preferable to add a photo polymerizable monomer to the hydrophilic resin. Hydrophilic photo polymerizable monomers may be used herein instead of the resins described above. The hydrophilic photo polymerizable monomers are at least selected from the group consisting of polyether modified monomethacrylate,methacrylamide derivatives, amino substituted monomethacrylate, hydroxyl substituted monomethacrylate, phospho substituted monomethacrylate and nitrogen heterocyclic vinyl monomer. Typical examples of these monomers are selected at least from the group consisting of diethylacrylamide, dimethylacrylamide (SN-SX- 2833, available from San Nopco Ltd.), monomethacrylate which has a polyethylene glycol unit, alkyl substituted methacrylate, alkoxyl modified methacrylate, methylol modified methacrylate, N, N-dimethylaminoethyl methacrylate, N, N-diethylaminoethyl methacrylate, hydroxyethyl methacrylate, hydroxypropyl methacrylate, polyol diglycidyl ether monomethacrylate, alkylene oxide modified phosphate monomethacrylate, caprolactone modified phosphate monomethacrylate, acryloyimorpholine, N-vinyloxazolidone, N-vinylsuccinimido, N-vinylpyrrolidone and N-vinylcaprolactam. In order to improve the photo curing characteristics of such monomers, polyol and its alkyleneoxide adducts of methacrylic ester, polyol diglycidyl ether dimethacrylate and the like may be used in an amount of about 50 wt % to 100 wt %. Accordingly, it is possible to use herein hydrophilic photo polymerizable roomers exclusively.

These monomers are formulated with photo polymerization initiators to prepare UV-curable resins. Typical initiators used in the invention include, for example, acetophenone, benzophenone, Michler's ketone, benzylbenzoin, benzoin ether, benzoyl bezoate, benzyl dimethyl ketal, 1-hydroxycyclohexylphenylketone, thixanthones, benzyl, 2-ethylanthraquinone, methylbenzoylformate, diacetyl and the like. The photo polymerization initiators are added in an amount of about 1 to 8 wt %, and preferably, 2 to 6 wt %. If the amount of the initiator is in excess, the working ability during printing tends to decrease. On the contrary, when the amount is smaller, the productivity would drop down or would result in poor UV-curability. The hydrophilic resins may be mixed with the photo polymerizable monomers for the purpose of viscosity modification.

Additives may be formulated in the hydrophilic materials. For instance, water-absorptive pigments, wetting agents, anti-foamers, surface tension controlling agents and the like may be added. Specific examples of the additives include inorganic pigments such as silica fine powder, talc, mica, calcium carbonate, titanium oxide, zinc oxide, colloidal silica, carbon black, red iron oxide and the like, fine powders such as of carboxymethyl cellulose, dextrin, methyl cellulose and the like, organic pigments such as polyvinyl pyrrolidone with a specific type coating for the purpose of being rendered insoluble in amide-based acrylates, acrylic acid/vinyl alcohol copolymers (Sumika Gel SP-510, available from Sumitomo Chem. Co., LTD.), collagen powder and the like, anionic or nonionic known wetting agents (NOPCO 2272RSN (U.S.Registration No. 1670983), NOPCO WET 50 (U.S. Registration No. 937032), and NOPCO WET SN20T, all products available from San Nopco Limited), anti-foamers (NOPCO 8034, available from San Nopco Limited, Dehydran 1620 (U.S. Registration No. 1407792), available from Henkel and AD 3901, available from Mitsubishi Rayon Co., Ltd.), surface tension controlling agents (Perenol s43 and s5, available from Henkel) and thickeners such as polyethyleneimine (SP103, available from Nippon Shokubai Co.,Ltd.), and the like.

The water-absorptive pigments used as an additive serve to control the printability of ink and working properties on formation of the hydrophilic film. The wetting agent contributes to improve the wettability and can control fluidity to obtain a mixture with a reduced degree of foaming. This permits the formation of the layer according to the step of forming other layers, such as a screening printing step, in the fabrication process in the optical information medium. Thus, the production efficiency can be improved. The anti-foamers and surface tension controlling agents contribute to the formation of uniform film.

The addition of pigments to hydrophilic resins enables one to obtain the hydrophilic resin film 26 which is opaque or cloudy, or is colored. In doing so, an appropriate optical information medium may be selected depending on the type of ink color and the degree of printing, with its appearance being improved. If one makes use of the color of a layer provided beneath the protective layer, it is possible to make a relief engraved pattern by formation of a so-called offprint.

The hydrophilic resin film 26 should not preferably contain water, ethyl alcohol, isopropyl alcohol, ethylene glycol, ethyl cellosolve, dimethylformamide and the like. The solvent will attack the protective layer formed below and a UV-cured resin, leading to some possibility that reliability is lowered. If a solvent is contained, the viscosity is varied on formation of the hydrophilic resin film such as by screen printing, presenting the inconvenience in the fabrication procedure.

The thickness of the hydrophilic resin film 26 should preferably be in the range of from 5 to 30 μm in order to prevent an adverse influence on recording and reproducing characteristics of the medium. Such a thickness is established by appropriately formulating the starting materials to control the viscosity. In addition, the hydrophilic resin film 26 may be thickened to a thickness more than that of the protective layer 25 so as to increase the cushioning effect.

It is preferred that the hydrophilic resin film 26 is formed on the protective layer 25 made of a UV-cured resin. Especially, immediately after the formation of the UV-cured resin film protective layer 25, i.e., during the time when the activity of the UV-curable resin serving as an underlying layer is not lost prior to complete curing, the hydrophilic resin film 26 is formed. As a consequence, the layers are combined together at the boundary thereof, thereby improving the bonding properties.

It is desired that the boundary bonding properties between the hydrophilic resin film 26 and the protective layer 25 should be more satisfactory than those of other layers consisting of the optically transparent substrate. Such satisfactory bonding properties may be achieved by an appropriate combination of a resin material for the protective layer 25 and a hydrophilic resin material to be applied thereon and an employment of a film formation procedure described above. In the case of an optical information medium shown in FIG. 3, for example, comprising in order of the dye recording layer 23 on the substrate, the metallic reflective film 24 and the protective layer 25 made of UV-curable resins such as epoxy resin and acryl resin, the satisfactory bonding properties are achieved by forming a hydrophilic UV-curable resin film comprising amide acrylate and polyvinyl pyrrolidone as the hydrophilic resin film 26. When the boundary bonding properties between the protective layer 25 and the hydrophilic resin film 26 are satisfactory, the hydrophilic resin film 26 is hardly stripped off if the film 26 is formed only partially on the surface of the protective layer 25, and plays a role in protecting the optical information medium together with the layer 25, thereby decreasing the deflection or strip off of the substrate and preventing the deterioration of recording and reproducing characteristics.

It is preferred that the degree of shrinkage of the hydrophilic resin film at the moment of film formation should be smaller than that of the dried UV-curable resin used for the protective layer 25. From a view point of protection of the optical information medium against a drawing or printing pressure, the hardness of the hydrophilic resin film 26 should preferably be smaller than that of the protective layer 25, for instance, smaller than those hardness thereof ranging from 2H to 7H/Grass. The degree of shrinkage or hardness depends on numbers of functional groups in monomers to be formulated in the UV-curable resins for the protective layer 25 and the hydrophilic resin film 26. Such preferable values described above are achieved by selecting an adequate monofunctinal or bifunctional monomer or the like as the hydrophilic resin depending on the properties of materials to be formulated, thereby preserving the product reliability of the optical information medium without accompanying any deflection or strip off and securing stable recording and reproducing.

The hydrophilic resin film should preferably be finely roughened on the surface thereof. When a printing ink is deposited on the surface of the protective layer 25, the finely roughened surface permits an anchoring effect to be developed, wherein the deposited ink is retained and fixed in fine recesses of the surface. The roughened surface results in an increase in surface area of the hydrophilic resin film 26, thereby promoting ink absorption. The term "roughened surface" used herein is intended to mean a surface whose contact angle relative to an aqueous ink is smaller than that of a surface not being roughened. When determined using a contact surface roughness tester, the roughened surface should preferably have an average roughness (Ra) of from 2.0 to 0.1 µm. The effect of the surface roughness on aqueous ink may, more or less, vary, depending on the physical properties of the film. In general, if the surface roughness is small, thin spots may be created when an ink is formed as solid although fine lines can be drawn with good resolving power. If the surface roughness is too great, both fine lines and solid patterns are liable to blot. Preferably, the average roughness (Ra) is in the range of 1.0 to 0.5 µm. In this range, both fine line and solid prints obtained are good in practice.

The finely oughened surface of the hydrophilic resin film 26 can be formed by coating a hydrophilic resin on the surface of the protective layer by use of graver coating procedure. For instance, a resin mixed with a filler may be coated on the surface of the protective layer 25 by screen printing, spin coating or the like coating procedure. When an organic or inorganic pigment is dispersed in the hydrophilic resin film 26, the roughened surface can be readily formed, with a great anchoring effect. The particle size of the pigment is appropriately in the range of 1 to 10 µm, preferably from 3 to 5 µm, within which good solid printability is attained.

Moreover, when the hydrophilic resin film is subjected to a plasma treatment to modify the surface thereof, the ink fixation characteristics to the surface of the film 26 can be improved. More particularly, an optical information medium is placed in an atmosphere of a dilute inert gas under highly reduced pressure conditions where a plasma is generated in the gas to treat the medium. By the treatment, the ink deposited on the thus treated surface becomes small in surface tension and also in the angle of contact of the ink, thus leading to an improvement in the wettability of the ink. The printing of an ink on the surface should preferably be effected as immediately as possible after the plasma treatment.

Inks applicable to the optical information medium of the invention are preferably aqueous inks although oily and/or UV-curable inks may be used.

As stated hereinbefore, where letters are printed on the surface of the hydrophilic resin film 26, it is preferred to use ink jet printers although drawing or screen printing may be used. As is well known in the art, ink jet printers are employed for personal computers and the like. Letters or patterns which are created in a computer may be repeatedly printed on the surface of the hydrophilic resin film 26. In this sense, this type of medium is adapted for printing given letters or patterns on a relatively small number of mediums. Since it is possible to print without any mechanical impact such as tapping or without application such as of heat for fixing, the medium is not damaged. Further, there may be used a bubble jet system wherein a nozzle portion is heated by a heater to provide ink particles for printing.

The invention is more particularly described by way of examples.

There was provided a polycarbonate substrate (Iupilon; available from Mitsubishi Gas Chemical Co., Ltd.) which had been pressed by means of stampers to have a spiral tacking guide groove with a 0.8 µm in width, a 0.08 µm in depth and 1.6 um in track pitch and which had an outer diameter of 120 mm, an inner diameter of 15 mm and a thickness of 1.2 mm within a diameter range of 46 to 117 mm. This substrate had a pencil hardness of HB and a thermal expansion coefficient of $6 \times 10^{-5}$ 1° C. at 20° to 120° C.

A portion of 0.65 g of 1, 1-dibutyl-3, 3, 3, 3-tetramethyl-4, 5, 4, 5-dibenzoindo dicarbocyanine perchlorate (available from Nihon Kankoshikiso Kenkyusho) was dissolved in 10 ml of diacetone alcohol. The resultant solution was spin coated on the substrate while changing the number of revolutions so as to make an average thickness of 130 nm, followed by drying to form a dye recording layer. A 100 nm thick reflective layer was formed on the dye recording layer by sputtering of gold. A disused part of these two layers was removed to form the dye recording layer and the metallic reflective layer of a concentric circle of ranging from o 42 to 118.

A UV-curable resin (SD-17, available from Dainippon Inks Mfg. Co., Ltd.) made of a main acrylic component was applied by spin coating, and irradiated and cured with UV light of 230 mj/cm$^2$ from a high pressure mercury lamp to form a 10 µm thick protective layer. The protective layer comprising this UV-curable resin had a pencil hardness of 5H/on glass (2H/on PC).

To a formulated liquid of monofunctional UV-curable amide acrylate containing a photo polymerization initiator (SN5X-2833; available from San Nopco Ltd.) as a component A and difunctional polyethylene glycol diacrylate having a molecular weight of 400 (SN5X- 2911; also available from San Nopco Ltd.) as a component C, 10 wt % of powdery polyvinyl pyrrolidone (K90; available from Tokyo Kasei Kogyo Co., Ltd.) as a B component was dissolved and mixed thoroughly, and then fine powder of silica having a particle size of about 4 µm (XR37B; available from Tokuyama Soda Co., Ltd.) as a D component or surfaceinsolubilized UV- curable resin particle having a particle size of about 4 μm (KOLIDON CLM; available from BASF) as a component D' was added at a formuration ratio shown in the following. The mixture thus obtained was subjected to dispersion for 24 hours in a 2 liter-ball mill with twelve balls to prepare a solution of aqueous resin.

| Example No. | Component |
|---|---|
| 1. | A:B:C:D = 67:15:5:13 |
| 2. | A:B:C:D' = 65:15:5:15 |
| 3. | A:B:C:D = 57:15:15:13 |
| 4. | A:B:C:D' = 50:15:20:15 |

After the protective layer formation, the hydrophilic resin solution was applied on the protective layer within a concentric circle of 44 to 177 by screen printing and irradiated with UV light under the same condition as in the case of the protective layer to form a 15 um thick hydrophilic resin film.

A viscosity change with time of the hydrophilic resin solution used in Examples 3 and 4 is shown in Table 1 below.

TABLE 1

| | Viscosity Change (cps) | | |
|---|---|---|---|
| | imediately after mixing | after 6 days | after 13 days |
| Example 3. | 74,000 | 98,000 | 93,000 |
| Example 4. | 40,600 | 48,600 | 42,000 |

To compare the degree of shrinkage, the UV-curable resin used for the protective layer and the hydrophilic resin were respectively applied as a 10 um thick film on a polyethylene terephthalate film of 15 μm thick and cured under UV-irradiation. The UV-cured resin for the protective layer deflected much more than the hydrophilic resin did. Accordingly, the degree of shrinkage of the UV-cured resin is higher than that of the hydrophlic film.

Concerning the surface properties of the hydrophilic resin films thus formed, their surfaces were translucent and rough, and the surface roughness (Ra) determined by means of a contact roughness tester (DEKTAK 3030; available from Veeco Instruments Inc.) was in the range of 0.9 to 0.6 μm. The hardness of both resins was a pencil hardness of 4H/on glass (2H/on PC).

Given optical information was recorded in each optical information medium by irradiating a semiconductor laser having a wave length of 780 nm modulated with EFM signals along the guide groove at a power of 7.8 mW and at a linear velocity of 1.4 m/sec.

Subsequently, each medium was subjected to an accelerated deterioration test under a condition of a temperature of 70° C. and a humidity of 85% RH. No change was observed on the surface of the hydrophilic resin films at the time of 100 hours after the test started. For comparison, a similar accelerated test was carried out using a OHP sheet used for ink jet printers. Molten spots were observed sporadically on the surface of the sheet at the time of 100 hours after the test started.

On the other hand, the accelerated deterioration test was performed to determine the ink jet printability (IJP property) at times prior to (initial) and 24 and 100 hours after the test started by jetting a black aqueous ink on different regions from an ink jet printer. More particularly, the patterns ● and ▨ of the ink jet printer were printed to check solid printability as to whether these patterns could be printed without involving any half tone. In addition, a Chinese character having a number of strokes was printed to check a character printability whether the character could be printed while keeping clear spaces among stroke lines. The results are shown in Table 1 below.

TABLE 2

| Ex. No. | Printability | Initial | after 24 hrs. | after 100 hrs. |
|---|---|---|---|---|
| 1 | (solid) | slightly blurred | — | lesser than initial |
| 1 | (character) | good | — | good |
| 2 | (solid) | slightly blurred | — | good |
| 2 | (character) | good | — | good |
| 3 | (solid) | good | good | good |
| 3 | (character) | good | good | good |
| 4 | (solid) | good | good | slightly blurred |
| 4 | (character) | good | good | good |
| OHP sheet | (solid) | blurred | — | same as initial (76 hrs.) |
| OHP sheet | (character) | good | — | same as initial (76 hrs.) |

The hydrophilic resin solutions of Examples 3 and 4 were subjected to the accelerating deterioration test under a condition of a temperature of 70° C. and a humidity of 3% RH (dry) at times prior to and 100 hours after the test started so as to determine the IJP property. The results are shown in Table 3 below.

TABLE 3

| | | Initial | after 100 hrs. |
|---|---|---|---|
| Example 3 | (solid) | good | good |
| | (character) | good | good |
| Example 4 | (solid) | good | slightly blurred |
| | (character) | good | good |

Furthermore, a similar test as described above was carried out under the same condition to determine the angle of deflection of each optical information medium. In addition, a standard condition of a temperature of 23° C., a humidity of 50% RH and standing for 98 hours is also employed. The angle of deflection was determined according to the CD Standard wherein there was measured an angle along the radial at a position corresponding to a radius of 55 mm. from the center. The angle is shown as an average value of the measurements. For comparison, an optical information medium was prepared as having a 25 μm thick protective layer but without formation of any hydrophilic resin film. In all the case, the angle was not higher than 0.6° which is a value defined in the CD Standard. The results are shown in Table 4 below.

TABLE 4

| | Angle of deflection (°) | | |
|---|---|---|---|
| | Initial | after 100 hrs. | Standard condition (98 hrs.) |
| Example 3 | 0.05 | 0.18 | 0.13 |
| Example 4 | 0.02 | 0.17 | 0.15 |
| Comparative | 0.02 | 0.17 | 0.15 |

The hydrophilic resin film of each medium was subjected to the ink jet printing test in the same manner as set forth hereinbefore and also subjected to an accelerated deterioration test under a conditions of a temperature of 70° C. and a humidity of 85% RH for 8 hours and then at a temperature of 70° C. and a humidity of 3% RH (dry) for 100 hours to check blurring and blotting of the prints. Little degree of blurring and blotting were observed. Three minutes after the printing on the surface of the hydrophilic resin film of each medium, the print surface was rubbed with a finger. However, no burring defect was observed.

For comparison of the binding properties between the protective layer and the hydrophilic resin film, a separation test (i.e., a cross cut tape test) was conducted. As a result, it was found that while a value of 97/100 was attained for the protective layer portion, 100/100 was obtained for the hydrophilic resin film portion.

What is claimed is:

1. In a method for fabricating an optical information medium capable of reproducing optically readable information by means of a laser beam, said optical information medium comprising a plate-shaped, optically transparent substrate, a resin protective layer formed above the substrate and an intermediate layer formed between the protective layer and the optically transparent substrate, the improvement comprising the additional steps of:

forming an aqueous printing ink-fixable, hydrophilic resin film on a main surface of the protective layer before the activity thereof is lost; and affixing an aqueous printing ink on a surface of the hydrophilic resin film.

2. In a method for fabricating an optical information medium capable of reproducing optically readable information by means of a laser beam, said optical information medium comprising a plate-shaped, optically transparent substrate, a resin protective layer formed above the substrate and an intermediate layer formed between the protective layer and the optically transparent substrate, the improvement comprising the additional step of:

forming an aqueous printing ink-fixable, hydrophilic resin film on a main surface of the protective layer, said protective layer and hydrophilic resin film being formed from resins that shrink at the moment of hardening with the degree of shrinkage at the moment of hardening of the resin forming the hydrophilic resin film being smaller than that of the resin forming the protective layer.

* * * * *